(12) United States Patent
Steindl

(10) Patent No.: US 7,483,396 B2
(45) Date of Patent: Jan. 27, 2009

(54) METHOD FOR ASSIGNING AN IP ADDRESS TO A DEVICE

(75) Inventor: Günter Steindl, Poppenricht (DE)

(73) Assignee: Siemens Aktiengesellschaft, Munich (DE)

( * ) Notice: Subject to any disclaimer, the term of this patent is extended or adjusted under 35 U.S.C. 154(b) by 626 days.

(21) Appl. No.: 11/039,614

(22) Filed: Jan. 20, 2005

(65) Prior Publication Data

US 2005/0163118 A1     Jul. 28, 2005

(30) Foreign Application Priority Data

Jan. 23, 2004    (EP)   ................................ 04001453

(51) Int. Cl.
*H04L 12/28* (2006.01)
*H04L 12/66* (2006.01)
*G06F 15/16* (2006.01)
*G06F 15/173* (2006.01)

(52) U.S. Cl. ........................ 370/254; 370/389; 370/401; 709/203; 709/220; 709/229

(58) Field of Classification Search ................ 370/254, 370/389, 401; 709/203, 220, 229
See application file for complete search history.

(56) References Cited

U.S. PATENT DOCUMENTS

| | | | | |
|---|---|---|---|---|
| 5,598,536 A * | 1/1997 | Slaughter et al. | ............ | 709/219 |
| 6,167,052 A * | 12/2000 | McNeill et al. | ............. | 370/399 |
| 6,247,055 B1 * | 6/2001 | Cotner et al. | ............... | 709/227 |
| 6,298,383 B1 * | 10/2001 | Gutman et al. | .............. | 709/229 |
| 6,330,560 B1 * | 12/2001 | Harrison et al. | ................ | 707/8 |
| 6,697,360 B1 * | 2/2004 | Gai et al. | .................... | 370/389 |
| 6,862,286 B1 * | 3/2005 | Tams et al. | .................. | 370/401 |
| 6,876,667 B1 * | 4/2005 | Synnestvedt et al. | ........ | 370/466 |
| 6,957,086 B2 * | 10/2005 | Bahl et al. | .................. | 455/557 |
| 7,007,080 B2 * | 2/2006 | Wilson | ....................... | 709/221 |
| 7,096,273 B1 * | 8/2006 | Meier | ......................... | 709/236 |
| 7,120,787 B2 * | 10/2006 | Chu et al. | ...................... | 713/1 |
| 7,174,371 B2 * | 2/2007 | Elo et al. | .................... | 709/220 |
| 7,184,751 B1 * | 2/2007 | Davis et al. | ................. | 455/410 |
| 7,197,549 B1 * | 3/2007 | Salama et al. | ............... | 709/223 |
| 7,263,552 B2 * | 8/2007 | Govindarajan et al. | ...... | 709/224 |
| 7,295,556 B2 * | 11/2007 | Roese et al. | ............. | 370/395.3 |

(Continued)

FOREIGN PATENT DOCUMENTS

EP             1 081 921 A2     3/2001

(Continued)

OTHER PUBLICATIONS

"BOOTP and DHCP Parameters" (cf. internet page, http://www.iana.org/assignments/bootp-dhcp-parameters), Last Dated Nov. 23, 2004, pp. 1-7.

(Continued)

*Primary Examiner*—Alpus H Hsu

(57) ABSTRACT

The invention relates to a method for assigning an IP address to a device (116), comprising the following steps:
     connecting the device (116) to a port (110) of a switch (104),
     transmitting an identification code (124) of the port (110) from the switch (104) to the device (116),
     transmitting the identification code (124) of the port (110) from the device (116) to an address server (122),
     assigning the IP address to the device (116) on the basis of the identification code (124) of the port (110).

9 Claims, 3 Drawing Sheets

U.S. PATENT DOCUMENTS

| | | | |
|---|---|---|---|
| 2002/0009078 A1* | 1/2002 | Wilson et al. | 370/389 |
| 2003/0101243 A1 | 5/2003 | Donahue et al. | |
| 2003/0133450 A1* | 7/2003 | Baum | 370/389 |
| 2003/0216143 A1 | 11/2003 | Roese et al. | |
| 2004/0010653 A1 | 1/2004 | Grundy et al. | |
| 2004/0139228 A1* | 7/2004 | Takeda et al. | 709/245 |
| 2004/0143654 A1* | 7/2004 | Poirot et al. | 709/223 |
| 2004/0249960 A1* | 12/2004 | Hardy et al. | 709/229 |
| 2004/0250117 A1* | 12/2004 | Congdon | 713/201 |
| 2005/0027881 A1* | 2/2005 | Figueira et al. | 709/238 |
| 2005/0235000 A1* | 10/2005 | Keil | 707/200 |
| 2006/0155853 A1* | 7/2006 | Nesz et al. | 709/227 |

FOREIGN PATENT DOCUMENTS

| | | |
|---|---|---|
| WO | 2004006503 A1 | 1/2004 |

OTHER PUBLICATIONS

IEEE Std 803.1-1992 IEEE Recommended Practice for Unique Identification in Power Plants and Related Facilities—Component Function Identifiers—Description, IEEE Standards Description: 803.1-1992 Online, p. 1, XP002288535, Internet: URL: http://standards.ieee.org/reading/ieee/std public/description/nuclear/803.1-1992_desc.html.

Network Vision: Comparison between Auto-IP and DHCP Option 82, 2004, pp. 1-7, XP002288508, Internet: URL:http://www.intravue.net/a7toi8p/Aut-IP_Option82paper1.pdf.

Frank Seufert, "Network Management for Ethernet, a step in the right direction", IEEE 48, Year 2003, No. 11, pp. 32-34.

draft-bierman-ptopo-mib-proto-00.txt Physical Topology MIB and Discovery Protocol Proposal; Bierman et al., Mar. 25, 1997, pp. 1-38.

\* cited by examiner

| Identifier | Alias | IP (Example) |
|---|---|---|
| Device1 | Port4.Switch1 | 10.0.0.1 |
| Switch1 | Port2.Device1<br>Port1.Device2<br>Port1.SPS<br>Port1.ES1 | 10.0.0.2 |
| . . . | | |

METHOD FOR ASSIGNING AN IP ADDRESS TO A DEVICE

CROSS REFERENCE TO RELATED APPLICATIONS

This application claims priority to the European application No. 04001453.2, filed Jan. 23, 2004 and which is incorporated by reference herein in its entirety.

FIELD OF INVENTION

The invention relates to a method for assigning an IP address to a device, a digital storage medium, a switch, and a device that can be attached to the switch.

BACKGROUND OF INVENTION

The assignment of an internet protocol (IP) address to a device by means of DHCP (Dynamic Host Configuration Protocol) is known from the prior art. DHCP is normally used in Local Area Network (LAN) environments for allocating IP addresses from a central address server.

The selection of the IP address that must be assigned to the requesting device is performed by the DHCP server using the local settings (static or dynamic allocation) and the options that are supplied in the DHCP request. The DHCP server can unambiguously assign the locally stored IP address to a client by means of the DHCP options (cf. internet page http://www.iana.org/assignments/bootp-dhcp-parameters) "#12 Host Name Option", "#43 Vendor Specific Option", "#61 Client Identifier", "#82 Relay Agent Information", "#128-254 Private Use" or a further option that is newly defined.

In order to allow this unambiguous assignment, the selected identifier (identification code) must be unambiguous in all variants throughout a LAN.

This identifier must be residually stored on the client, so that a replicable result for the address resolution can be obtained. A UUID (Universal Unique Identifier) or a DNS (Domain Name Service) name, for example, can be used as an identifier for a client or a port of a client. A plurality of identifiers (aliases) for an IP address can be stored in the DHCP server.

As a result of the "#82 Relay Agent Information" in the DHCP, the terminal that requests the IP address can be accurately identified by the port of the coupling node (switch) to which it is connected. The option 82 is comparable with an identification via Media Access Control (MAC) address. It has the advantage that the identification takes place at Level 3 of the Open System Interconnection (OSI) layered model, and is therefore supported by the IP protocol (concerning this, see also IEE 48. Year 2003 No. 11, Pages 32 to 34, "Netzmanagement für Ethernet, Schritt in die richtige Richtung" [Network management for Ethernet, a step in the right direction], Frank Seufert).

The assignment of IP addresses by means of DHCP and "#82 Relay Agent Information" is also disclosed in the US patent applications US-A-20040010653 and US-A-20030101243.

A disadvantage of the assignment of IP addresses by means of DHCP and Option 82 is that the switches are heavily loaded by the resource-intensive filtering of the DHCP requests. A switch must identify all DHCP requests by means of such a filter and remove them from the data stream for the purpose of entering additional information or recognizing that an entry already exists. The DHCP request is then reinserted into the data stream. It is particularly disadvantageous here that efficient switching mechanisms such as cut-through are rendered impossible.

SUMMARY OF INVENTION

The invention addresses the problem of providing an improved method for assigning an IP address to a device. The invention also addresses the problem of providing a corresponding digital storage medium, a device and a switch.

The problems that are addressed by the invention are solved in each case by the features in the independent patent claims. Preferred embodiments of the invention are specified in the dependent patent claims.

The invention provides a method for assigning an IP address to a device, wherein an identification code of the port to which the device is attached is transmitted from the switch to the device. The identification code of the port is then transmitted from the device to an address server, which assigns an IP address to the device on the basis of the identification code of the port. This method is applied if the device has not yet received an identification code "of its own".

It is particularly advantageous here that the resource-intensive filtering of the data packets, as required in the prior art so that the DHCP requests can be recognized by the switch, is eliminated. The load on the switch is thereby reduced and efficient switching mechanisms such as cut-through, for example, can be used in the switch.

This is particularly advantageous for applications in automation engineering, in particular for Industrial Ethernet and Realtime Ethernet. In particular, the invention allows efficient network management of Ethernet applications in the industrial sector, where said applications often feature a great number of nodes.

For example, a faulty device can be replaced by a replacement device without the need for manual intervention in the network management. The assignment of the IP address to the replacement device can take place automatically without any user interaction.

According to a preferred embodiment of the invention, the identification code of the port is transmitted using a neighbor discovery protocol to the device that is attached to the port. The LLDP protocol according to STANDARD IEEE802.1AB is particularly suitable for this. Using the mechanisms of the Slow protocol (STANDARD IEEE803.1), LLDP provides neighborhood information in connected networks. This neighborhood information is used for unambiguous addressing.

According to a preferred embodiment of the invention, the assignment of an IP address is done in accordance with the DHCP protocol. According to the DHCP protocol, the allocation of the IP address to a device is initiated by the device itself, i.e. by the device itself sending a corresponding DHCP request to a DHCP address server. This DHCP request contains the identification code of the port to which the device is attached, as a basis for the assignment of the IP address to the device.

According to a further preferred embodiment of the invention, the Discovery and Configuration Protocol (DCP) is used. Unlike DHCP, allocation of the IP addresses is not initiated by the terminals in this case, but by a DCP address server. Said server requests the identification code of the port to which the device is attached from the device concerned, in order to assign the IP address to the device on this basis.

There are e.g. two variants for the operation described above:

a) It is predetermined that a device is to be connected to a specific port of a switch. If it is not connected, the DCP address server polls the switch, asking the question: "Who is connected to Port x". If the switch replies "Nobody", polling continues. If the switch replies device xyz, this device is given an address and a name. It is particularly advantageous here that there is less traffic in the network because only unicasts are used.

b) It is predetermined that a device is to be connected to a specific port of a switch. If it is not connected, the DCP address server polls the potentially present device by means of a DCP Multicast, asking the question: "Who is connected to Port x". If nobody replies, polling continues. If the device xyz replies, this device is given an address and a name. It is particularly advantageous here that the switch only has to specify its port ID via LLDP.

BRIEF DESCRIPTION OF THE DRAWINGS

Preferred embodiments of the invention are explained in greater detail below with reference to the drawings, in which.

DETAILED DESCRIPTION OF INVENTION

Figure 1:
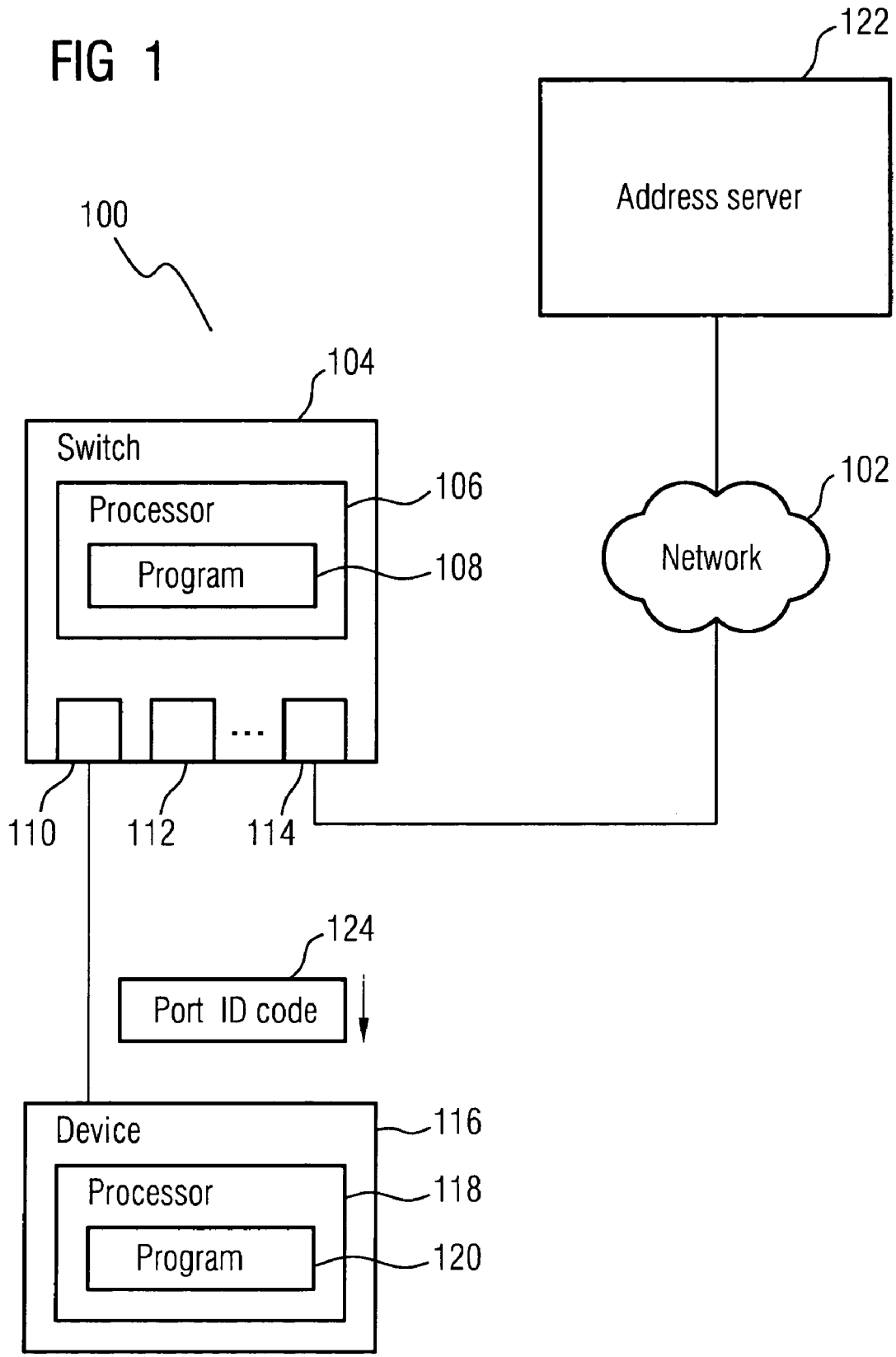
FIG. 1 shows a block diagram of an embodiment of a network in accordance with the invention.

FIG. 1 shows an automation system 100. The automation system 100 has a communication network 102, e.g. an Ethernet. The network 102 includes a plurality of coupling nodes, so-called switches, of which one switch 104 is shown by way of example in FIG. 1.

The switch 104 has a processor 106 for executing a computer program 108. The computer program 108 is usually stored on a digital storage medium, e.g. a working memory. The switch 104 has various ports, of which the ports 110, 112, 114 are illustrated in FIG. 1 by way of example. Each of the ports of the switch 104 has a port identification code, which is also called a port ID.

An automation device 116 is connected to the port 110. In principle, the automation device 116 can be any device of the automation engineering, e.g. a sensor, a drive, a controller or similar.

The automation device 116 has a processor 118 for executing a computer program 120. The computer program 120 is stored on a digital storage medium, e.g. a working storage, in a manner that is known per se.

An address server 122 is linked via the network 102 to the port 114 of the switch 104. The address server 122 is used for assigning internet protocol (IP) addresses to the participants of the automation system 100.

The procedure for assigning an IP address to the automation device 116 is as follows:

Following connection of the automation device 116 to the port 110, the automation device 116 receives the port identification code 124 from the port 110. The port identification code 124 is stored in the automation device 116. The port identification code 124 is then transmitted from the automation device 116 via the switch 104 and the network 102 to the address server 122. On the basis of the port identification code 124, the address server assigns the automation device 116 its IP address.

This method can be used during initialization of the automation system 100, in order to assign an IP address to all the participants of the automation system. This method is particularly advantageous in that it can also be used when replacing a faulty device.

If the automation device 116 fails, for example, it is replaced by a corresponding functioning automation device 116. As a result of connecting the replaced automation device 116 to the port 110, the allocation of the IP address is initiated again.

In this case, the algorithm for allocating the IP addresses arrives at the same result as when assigning the IP address to the original automation device 116, since the algorithm was performed on the basis of the same port identification code 124.

A so-called neighbor discovery protocol is preferably used for transmitting the port identification code 124 from the switch 104 to the automation device 116. Such neighbor discovery protocols are known per se from the prior art. Automatic exchange of data between neighboring devices in a network takes place using a neighbor discovery protocol.

The neighbor discovery is preferably done by LLDP in accordance with Standard IEEE802.1AB (see internet page http://www.ieee802.org/1/pages/802.1ab.html). Using LLDP, each Ethernet participant (DTE) provides its name (chassis ID) and the send port (port ID). Using the mechanisms of the Slow protocol (IEEE803.1), LLDP provides neighborhood information in switched networks.

Preferably, DHCP is used for transmitting the port identification code 124 from the automation device 116 to the address server 122. In this case, the address server 122 is a so-called DHCP server. In accordance with the DHCP protocol, the automation device 116 sends a DHCP request to the address server 122, in order to request the assignment of an IP address. In this case, the port identification code 124 is transmitted as part of the DHCP request from the automation device 116 to the address server 122, which assigns the IP address to the automation device 116 on this basis.

Alternatively, DCP is used. In this case, the address server 122 is a DCP server. In contrast with DHCP, the initiative for assigning the IP address comes not from the automation device 116, but from the DCP address server 122 itself. In response to a corresponding request from the DCP address server 122, the automation device 116 replies with the port identification code 124 that is stored in the automation device 116. On this basis, the DCP address server 122 then performs the assignment of the IP address to the automation device 116.

Preferably, LLDP is used in connection with DHCP and Option 82. Since each device knows its neighbors via LLDP, this information can be used for the unambiguous addressing. If DHCP is used in the network 102, the DHCP address server 122 also stores the neighborhood information for an IP address in addition to the client ID or host ID. If the automation device 116 requests an IP address from the DHCP address server 122, for example, it fills the field that is designated as Option 82 using the chassis ID and port ID (i.e. port identification code 124, for example) which are received from the neighbor, i.e. from the switch 104. This completely removes the need for the resource-intensive filtering of the DHCP requests in the switches, but the DHCP address server 122 can nonetheless assign an IP address by means of the topology information, i.e. the port identification code 124.

In this case, it is particularly advantageous that device replacement, e.g. in the event of a fault in the automation device 116, is possible without a programming device, an exchangeable storage medium e.g. MMC, or intervention at the DHCP address server 122. Furthermore, LLDP is an inexpensive protocol to implement. Consequently, the switches of the automation system 100 can be implemented less expensively while offering the same performance characteristics.

If DCP is used in the network 102 under consideration, the DCP client, i.e. the automation device 116, for example, stores the neighborhood information in addition to the station name, i.e. the client ID. Using DCP, the direction when allocating the address is reversed in comparison with DHCP. For example, the DCP address server 122 might need to search actively for a specific automation device, e.g. the automation device 116.

It can carry out this search either via the station name, client ID, chassis ID or via neighborhood information. If the DCP address server 122 finds the required device 116, the assigned IP address is allocated.

As a variant, however, the neighborhood information can also be given to the DCP address server 122. In this case, the search via station name, client ID or chassis ID can be omitted, since the neighborhood information is sufficient for the subsequent procedure.

As a variant, only the name of the station, client ID and chassis ID are given to the DCP address server 122. In this case, the search for the automation device 116 is done via the name of the station, client ID and chassis ID, and the stored neighborhood information.

During the start-up phase, the name of the station, client ID and chassis ID are stored once in the automation devices of the automation system 100. These are subsequently used for the search. If the desired automation device is found, the neighborhood information is additionally read out and stored in the DCP address server 122.

In this embodiment, it is particularly advantageous that, instead of a DHCP address server, a considerably less expensive DCP address server is used. This embodiment is particularly suitable for smaller automation systems having relatively few participants.

Figure 2:
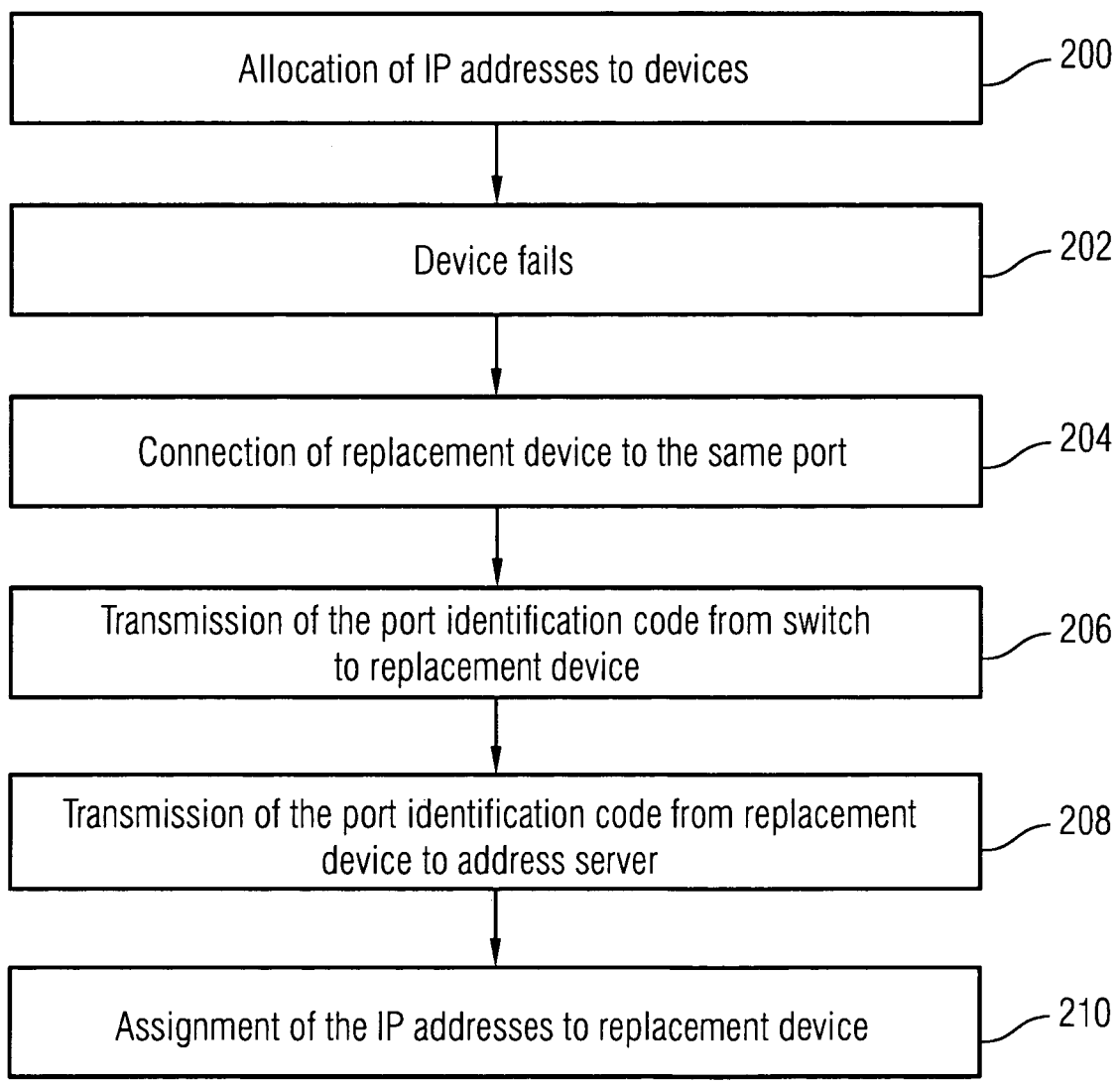
FIG. 2 shows a flow diagram of an embodiment of a method in accordance with the invention.

FIG. 2 shows a corresponding flow diagram. In the step 200, the allocation of the IP addresses to the participants of the automation system takes place during the start-up of the automation system. In the step 202, one of the automation devices fails during the operation of the automation system.

In the step 204, the faulty automation device is replaced by connecting it to the same port of the same switch as the original automation device. In the step 206, the port identification code is transmitted from the switch to the replacement device. This is preferably done in accordance with the neighbor discovery protocol. In the step 208, the port identification code is transmitted from the replacement device to an address server. This is done in accordance with DHCP or DCP, for example. In the step 210, the assignment of the IP address to the replacement device is done by the address server.

Preferably, the steps 206, 208 and 210 are also executed in the same manner during the start-up phase of the automation system, i.e. in the step 200. This means that the steps 206 to 210 are repeated for the replacement device during the live operation of the automation system 100, wherein the allocation algorithm for the IP address comes to the same result since the port identification code has not changed.

Various application scenarios of the present invention are explained by way of example below:

Scenario 1:
All devices have received their identifier (identification code) and are activated. Following the activation, the devices send a DHCP request containing the identifier to the DHCP server. This server assigns an unambiguous IP address to the client in the reply.

Principle:

| Identifier | Alias | IP |
|---|---|---|
| Client1.Setup1.Site1 | Port1.Client2.Setup1.Site1 | 10.0.0.1 |
| Client2.Setup1.Site1 | Port3.Client1.Setup1.Site1 | 10.0.0.2 |
| Client3.Setup1.Site1 | Port1.Client2.Setup1.Site1 | 10.0.0.3 |
| ... | | |

Scenario 2:
A client is exchanged in a live setup. This client is taken from stock and does not know its identifier. It makes use of the port identifier of its neighbor, which is stored in the DHCP server as an alias for the client. The new client obtains its identifier via the "host name", for example, which is likewise available from the DHCP server, and stores it residually for further use.

Scenario 3: (using DCP):
A setup is constructed in which all neighborhoods and the connection point of the engineering system (ES) are known. After the activation of the voltage, no client has an identifier. The planning and design system (engineering system (ES)) knows the identifiers that must be allocated and searches for its direct neighbor via LLDP. If this neighbor is identified, it is named via e.g. DCP using its identifier.

The client having the identifier forwards this to its direct neighbors via LLDP. These are therefore addressable via the ALIASES that are described in Scenario 2 and are likewise named. As a result, the whole LAN/partial LAN/whole neighborhood is cumulatively "named".

Scenario 4: (using DHCP):
A setup is constructed in which all neighborhoods and the connection point of the engineering system (ES) are known. After the activation of the voltage, no client has an identifier. The ES knows the identifiers that must be allocated and searches for its direct neighbor via LLDP. If this neighbor is identified, it is "named" via e.g. DCP using its identifier.

The client having the identifier forwards this to its direct neighbors via LLDP.

These are therefore addressable via the ALIASES that are described in Scenario 2 and receive their IP address and their identifier via DHCP. As a result, the whole LAN/partial LAN/whole neighborhood is cumulatively named.

Scenario 5: (using DCP):
A production machine is constructed/a plurality of production machines are constructed, wherein all neighborhoods and the connection point of the engineering system (ES) are known for one production machine.

Using the method that is described in Scenario 3, the whole machine can be individualized "at the touch of a button". A rapid start-up is therefore possible with little effort.

In addition to the ES, this task can also be performed by an SPS or by a simple naming device.

Figure 3:
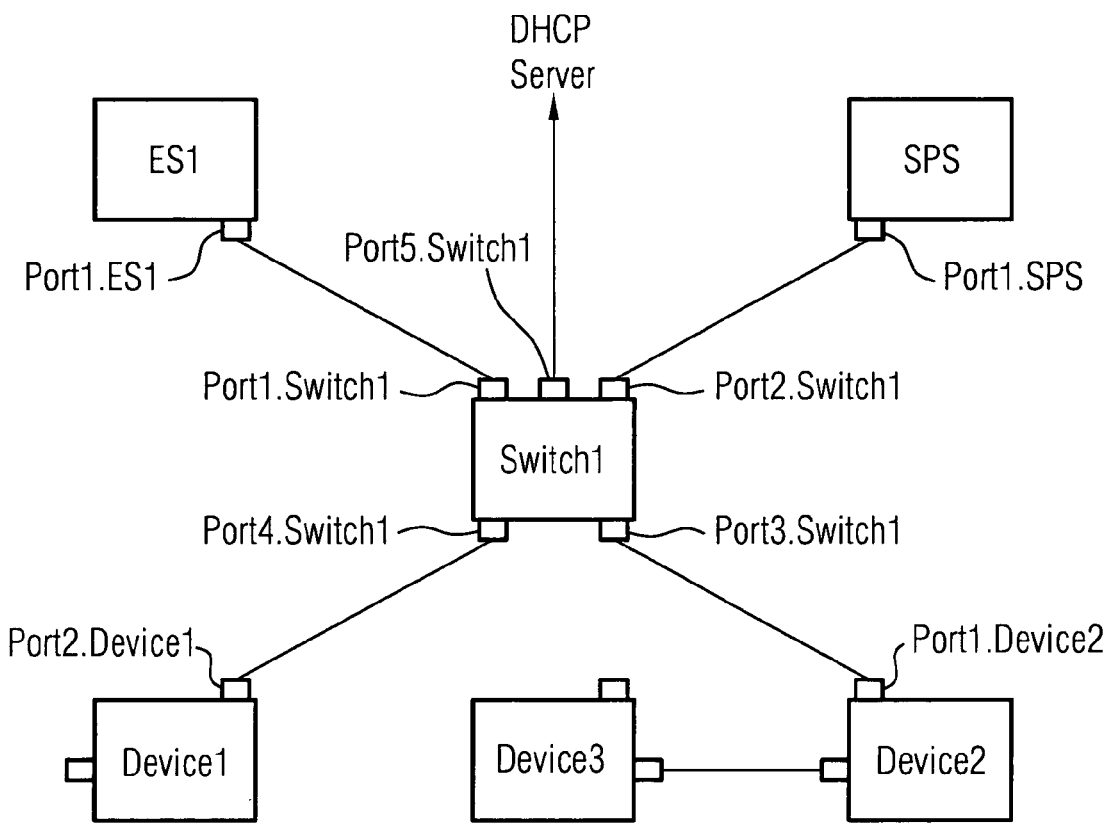
FIG. 3 shows a block diagram of an exemplary embodiment of a network.

FIG. 3 shows an example of a corresponding network topology.

The invention claimed is:
1. A method for assigning an Internet Protocol (IP) address to a client device connected to a data communications switch on a network, comprising:
  connecting a given client device to a port on the switch for data communication between the given client device and the switch;
  the switch sensing the connection of the given client device to the port, and the switch then automatically transmitting an identification code of the port (port ID) to the given client device;

the given client device receiving the port ID from the switch, and the given client device then automatically transmitting the received port ID in a request to an address server via the switch without filtering of the request in the switch;

the address server receiving the port ID from the given client device, and the address server then automatically assigning an unambiguous IP address to the given client device, wherein the assigning is initiated by the given client device transmitting the request to the address server, and wherein the port ID is used by the address server as a basis for assigning the IP address.

2. The method of claim 1, wherein the given client device is an industrial automation device comprising a sensor, a drive, or a controller.

3. The method of claim 1, wherein the port ID is automatically transmitted from the switch to the given client device using a neighbor discovery protocol.

4. The method of claim 3, wherein request is transmitted by the client device to the address server in accordance with a Dynamic Host Configuration Protocol (DHCP), in which the assigning of the IP address to the given client device is initiated by the given client device itself, and not in response to a polling by the address server.

5. The method of claim 4, further comprising additional client devices on respective ports on the network, wherein each of the client devices, upon activation, receives a respective port identification code from the respective port, and then each client device automatically sends a DHCP request containing the respective port identification code to the address server, which then automatically assigns a unique IP address to each client device in a reply to each client device, wherein the switch does not filter the DHCP requests from the client devices to the address server.

6. The method of claim 5, wherein the neighbor discovery protocol automatically provides network topology information, comprising the port identification code for each respective port, to the address server, and the address server stores the network topology information, and uses it to assign the unique IP address to each requesting client device.

7. The method of claim 1, wherein successive client devices successively use the port, and the address server assigns the same IP address to each successive client device on the port, based on the port ID.

8. The method of claim 7, wherein the steps of claim 7 are performed automatically upon replacement of a faulty client device on the port with a replacement client device, wherein an IP address assigned by the address server to the replacement client device is the same as a previously assigned IP address of the faulty client device, based on the same port ID used by both the faulty client device and the replacement client device.

9. The method of claim 8, wherein the faulty client device and the replacement client device are each an industrial automation device comprising a sensor, a drive, or a controller.

* * * * *